No. 849,256. PATENTED APR. 2, 1907.
E. P. MOORE.
COMBINED WIRE STRETCHER AND FASTENER.
APPLICATION FILED DEC. 19, 1906.
2 SHEETS—SHEET 1.
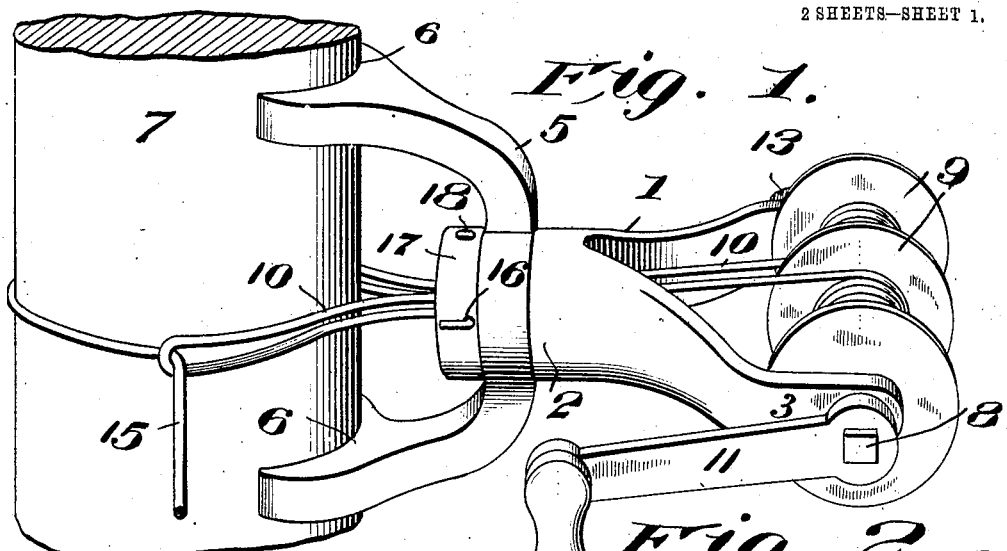
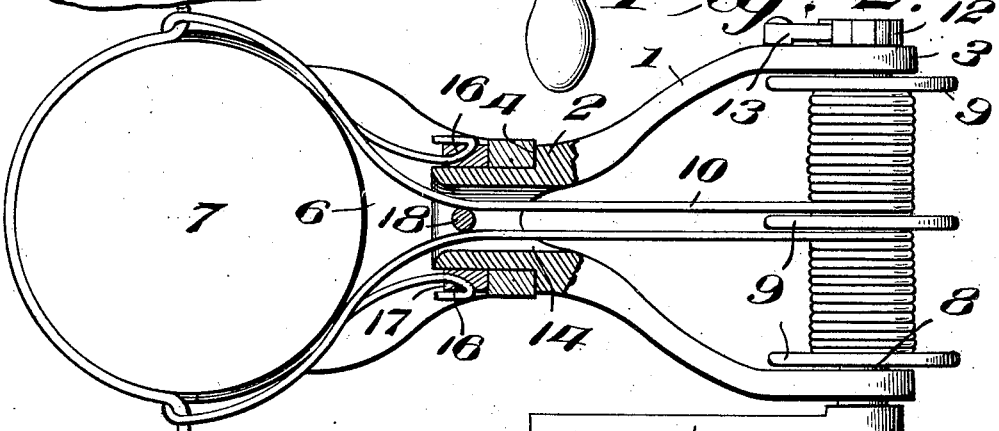
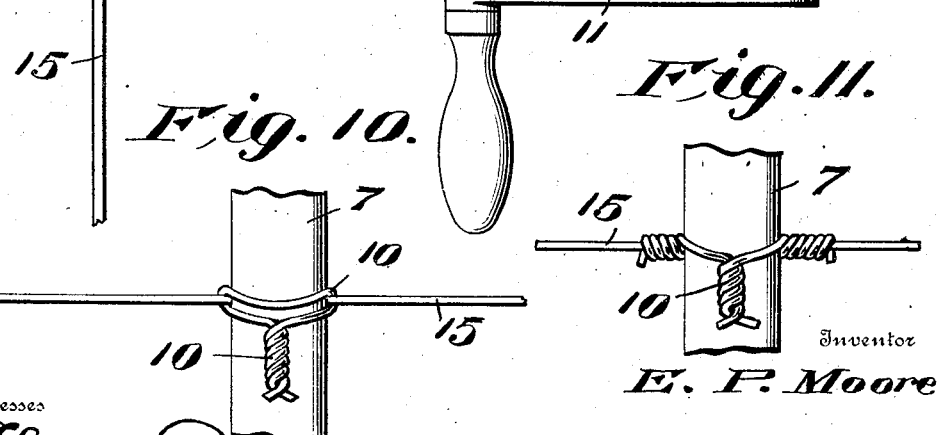
Inventor
E. P. Moore
Witnesses
By W. J. FitzGerald & Co.
Attorneys No. 849,256. PATENTED APR. 2, 1907.
E. P. MOORE.
COMBINED WIRE STRETCHER AND FASTENER.
APPLICATION FILED DEC. 19, 1906.
2 SHEETS—SHEET 2.
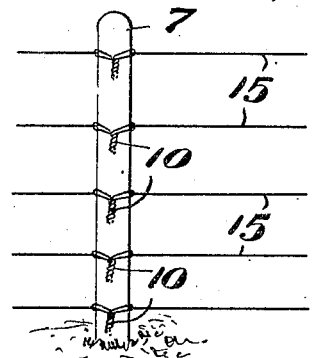
Fig. 3.
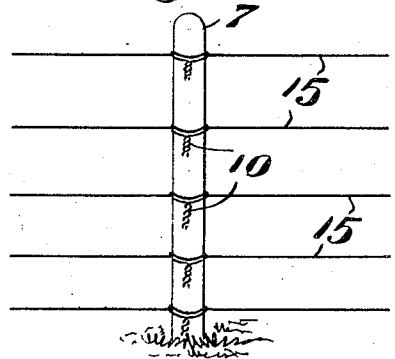
Fig. 4.
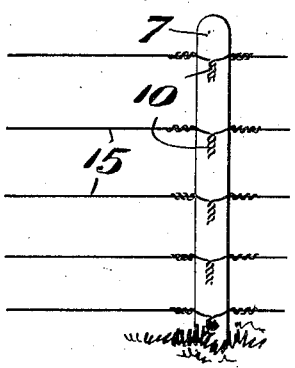
Fig. 5.
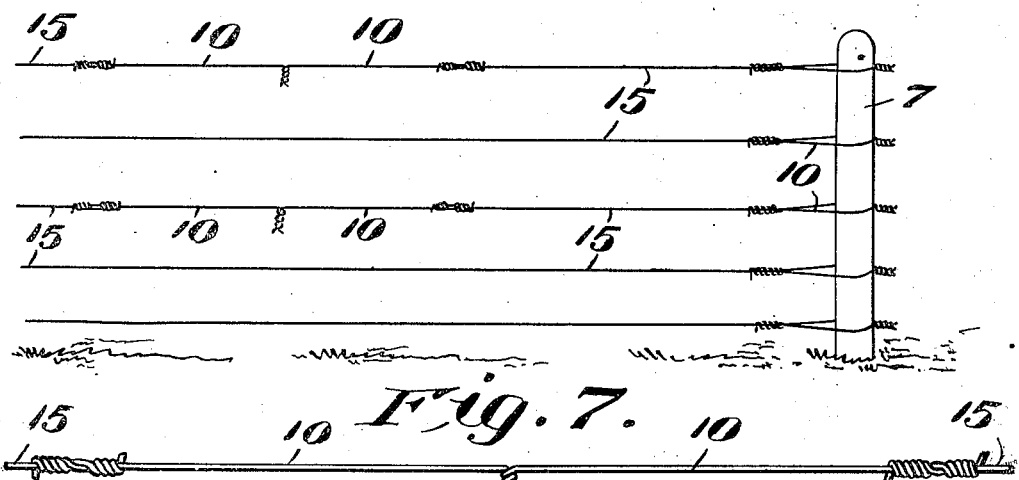
Fig. 6.
Fig. 7.
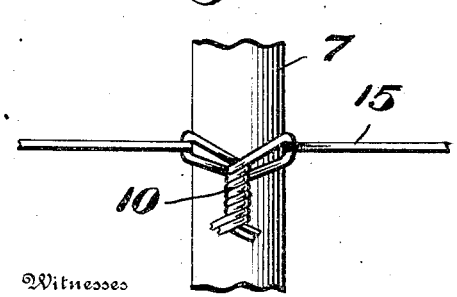
Fig. 8.
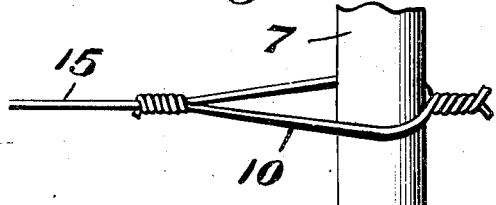
Fig. 9.
Witnesses
Inventor
E. P. Moore
By W. J. FitzGerald & Co.
Attorneys

UNITED STATES PATENT OFFICE.

EUGENE P. MOORE, OF STREATOR, ILLINOIS.

COMBINED WIRE STRETCHER AND FASTENER.

No. 849,256.          Specification of Letters Patent.          Patented April 2, 1907.

Application filed December 19, 1906. Serial No. 348,635.

*To all whom it may concern:*

Be it known that I, EUGENE P. MOORE, a citizen of the United States, residing at Streator, in the county of Lasalle and State of Illinois, have invented certain new and useful Improvements in a Combined Wire Stretcher and Fastener; and I do hereby declare the following to be a full, clear, and exact description of the invention, such as will enable others skilled in the art to which it appertains to make and use the same.

My invention relates to new and useful improvements in combined wire stretchers and fasteners, and more particularly that class adapted to be used in constructing wire fences; and my object is to provide a device of this class whereby the strands of fence-wire may be quickly and easily stretched and secured to the post.

A further object is to provide a device of this class whereby the severed ends of the fence-wires may be secured together to form a splice.

Other objects and advantages will be hereinafter referred to, and more particularly pointed out in the claims.

In the accompanying drawings, which are made a part of this application, Figure 1 is a perspective view of my improved device complete, showing the same as applied to use. Fig. 2 is a top plan view thereof, showing portions of the device broken away. Figs. 3, 4, and 5 are perspective views showing the manner of securing the wires to the fence-post. Fig. 6 is a perspective view showing the manner of securing the broken ends of the wires together. Fig. 7 is a detail view, on an enlarged scale, showing the manner of splicing the ends of a broken wire. Fig. 8 is a detail view, on an enlarged scale, showing the manner of securing the wires to the post as disclosed in Fig. 3 of the drawings. Fig. 9 is a detail view, on an enlarged scale, showing the manner of attaching the wires to the end post; and Figs. 10 and 11 are detail views, on an enlarged scale, showing the manner of securing the wires to the post as disclosed in Figs. 4 and 5, respectively.

Referring to the drawings, in which similar reference-numerals designate corresponding parts throughout the several views, 1 indicates the frame of my improved device, which consists of a tubular head 2, which is provided at one end with rearwardly-extending arms 3 and is reduced at its forward end to form a circumferential shoulder 4.

Disposed over the reduced end of the head 2 and resting against the shoulder 4 is a yoke 5, the outer curved ends of which are provided with curved faces 6, which are adapted to rest against the post 7 when the device is in use.

Disposed through the free ends of the arms 3 and finding bearings therein is a shaft 8, upon which is disposed a spool 9, having one or more winding-spaces thereon, upon which are wound securing-wires 10. The shaft 8 is of sufficient length to extend beyond each of the arms 3 and has secured to one end thereof a crank 11, while the opposite end is provided with a ratchet-wheel 12, with which is adapted to coöperate a latch 13, which is pivotally secured to one of the arms 3, so that when the latch is in engagement with the ratchet-wheel the shaft 8 will be held against rotation in one direction. The spool 9 is fixed to the shaft 8, so that when said shaft is rotated the securing-wires 10 will be wound upon the spool, so that said securing-wires will be drawn taut when the shaft is rotated in one direction.

In applying the device to use the free ends of the wires 10 are disposed through a bore 14 in the head 2 and then around a strand of the fence-wire 15, said wires passing on opposite sides of the post. The free ends of the wires are then brought back to the end of the head 2 and are disposed through openings 16 in a collar 17, said collar being disposed over the reduced end of the head 2 and in front of the yoke 5, said wires being secured in any preferred manner therein, as by bending the protruding ends of the wires parallel with the outer face of the collar. After the wires are thus disposed the spool 9 is rotated through the medium of the crank 11 until the wire 15 is partially drawn around the post and the wires 10 drawn taut, after which the head 2 is rotated in the yoke 5 by manually rotating the frame 1, thereby twisting the strands of the wires 10 between the head 2 and the post together, after which the wires 10 are severed at a point between the head 2 and the post, thus firmly securing the fence-wire to the post without employing the usual form of staple. This manner of securing the fence-wires to the post is best shown in Figs. 3 and 8. The collar 17 is held rigid with the head 2 and caused to rotate therewith by means of a pin 18, which extends laterally through the center of the head and collar and also serves to separate the extended ends of the wires 10, and the openings 16 in the collar 17 are preferably disposed through the collar, at diametrically opposite sides thereof, so that the ends of the wires 10 secured in the openings and the portions of the wires extended through the bore are in the same horizontal plane, in which position they may be readily twisted together by rotating the head and collar.

Instead of directing the free ends of the wires 10 around the fence-wire and through the openings 16 in the collar said free ends may be twisted around the wire 15 and then drawn taut by rotating the shaft 8, after which the two wires 10 are secured together by rotating the head 2, this manner of securing the wires together being shown in Figs. 5 and 11.

In some instances I employ but a single wire 10, in which case the free end of the wire is directed under the fence-wire 15, thence around the post and over the wire 15 on the opposite side of the post, and thence through one of the openings 16, after which the head 2 is rotated and the two ends of the wire 10 twisted together, this form of tie being best shown in Figs. 4 and 10 of the drawings.

In making a splice, as when a strand of the fence-wire becomes broken, the free ends of the wires 10 are secured to the severed portions of the wire 15, after which the shaft 8 is rotated until the fence-wire is drawn taut. Then by rotating the head 2 the protruding portions of the wires 10 are twisted and secured together, as best shown in Figs. 6 and 7 of the drawings.

Before the fence-wires 15 are secured in position around the post they are stretched in the line of fence and have their opposite ends secured to the end post, and to accomplish this result after the wires have been distributed along the line of fence one end thereof is secured to one of the end posts in any preferred manner, while one end of the wires 10 is secured at a distance from the opposite end of the wire 15 and drawn taut through the medium of the shaft 8, and after the end of the wire 15 has passed the end post the free end thereof is inserted into one of the openings 16 and the head 2 rotated, which will result in twisting the end of the wire 15 and the wire 10 together, thereby firmly securing the wire 15 to the end post and at the same time partially stretching the same, the result of the above operation being best shown in Figs. 6 and 9 of the drawings.

It will now be seen that I have provided a very cheap and economical means for securing the fence-wires to the posts and at the same time stretching the fence-wire. It will further be seen that I have provided means for securing the ends of the severed fence-wires together and also for securing the fence-wires to the end posts.

What I claim is—

1. The herein-described means for securing fence-wires to a post, comprising a frame having a head at one end and arms at the opposite end, a spool rotatably mounted between said arms, means to rotate said spool, said spool being adapted to receive wires which extend through said head and engage the fence-wire, and means to hold said wires while the same are being twisted together.

2. The herein-described means for securing fence-wires to a post, comprising a frame having a head at one end thereof and arms at the opposite end thereof, a shaft rotatably mounted in said arms, a spool fixedly secured on said shaft and between said arms, means to rotate said shaft, whereby wires secured thereto will be wound thereon, said wires extending through a bore in said head and engaging the fence-wire, and a collar on said head having openings therein to receive the free ends of said wires whereby when the head is rotated the wires will be twisted together.

3. The herein-described means for securing fence-wires, comprising a frame, a head on said frame having a bore therein, arms extended from said head, a spool rotatably mounted between said arms, means to prevent rotation of the spool in one direction, said spool adapted to receive wires which extend through said bore and into engagement with the fence-wires, a yoke on said head, a collar fixedly secured to said head and having openings therein to receive the free ends of said wires whereby said wires will be directed together when said head is rotated.

In testimony whereof I have signed my name to this specification in the presence of two subscribing witnesses.

EUGENE P. MOORE.

Witnesses:
JOHN HAMMOND,
M. J. WHALEN.